United States Patent [19]
Nagler

[11] Patent Number: 5,697,645
[45] Date of Patent: Dec. 16, 1997

[54] VEHICLE MUD GUARD

[76] Inventor: Yaacov Nagler, 7300 Pyle Rd., Bethesda, Md. 20817

[21] Appl. No.: 544,173

[22] Filed: Oct. 17, 1995

[51] Int. Cl.⁶ .................................. B62B 25/18
[52] U.S. Cl. ........................... 280/851; 280/848
[58] Field of Search ......................... 280/847, 848, 280/851

[56] References Cited

U.S. PATENT DOCUMENTS

| | | | |
|---|---|---|---|
| 2,196,225 | 4/1940 | Morrison | 280/848 |
| 2,843,074 | 7/1958 | Norman | 293/102 |
| 3,341,222 | 9/1967 | Roberts | 280/851 |
| 3,582,108 | 6/1971 | Carlton | 280/851 |
| 3,869,617 | 3/1975 | Gaussoin et al. | 280/851 |
| 5,199,742 | 4/1993 | Gotz et al. | 280/851 |
| 5,257,822 | 11/1993 | Metcalf | 280/851 |

FOREIGN PATENT DOCUMENTS

| | | | |
|---|---|---|---|
| 0233496 | 8/1987 | European Pat. Off. | 280/851 |
| 2524344 | 12/1976 | Germany | 280/851 |
| 48102 | 2/1981 | United Kingdom | 280/851 |

*Primary Examiner*—Richard M. Camby
*Attorney, Agent, or Firm*—Brady, O'Boyle & Gates

[57] ABSTRACT

A vehicle mud guard made from discarded tires connected to a T-flange is connected to the vehicle body. The tires are recycled and easily attached to the T-flange.

5 Claims, 1 Drawing Sheet

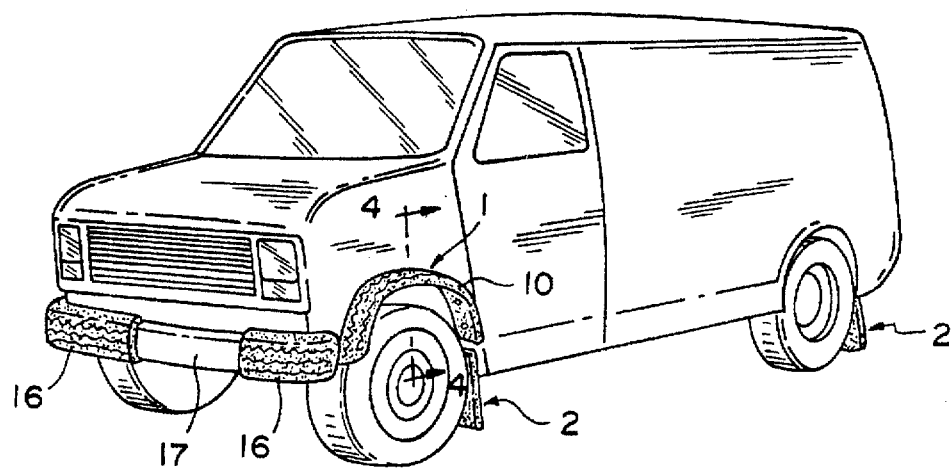
FIG_1
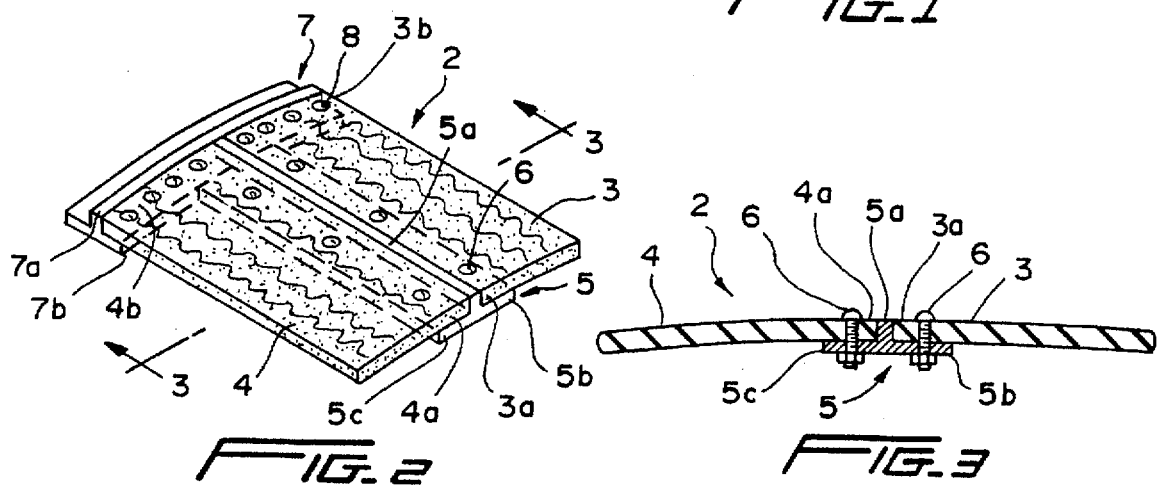
FIG_2
FIG_3
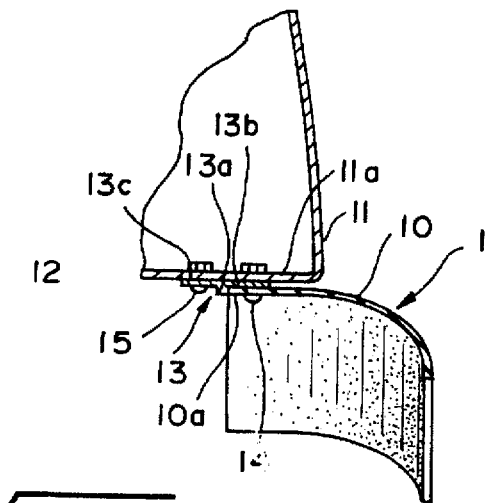
FIG_4
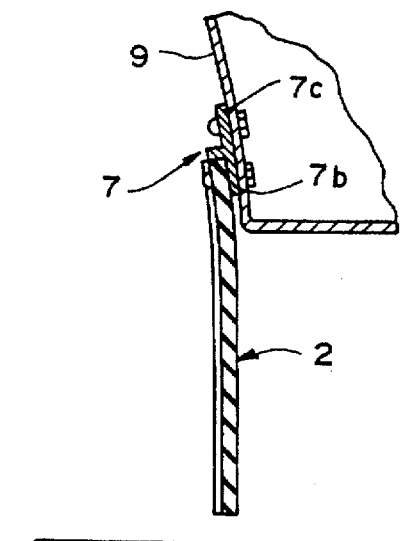
FIG_5

VEHICLE MUD GUARD

BACKGROUND OF THE INVENTION

In applicant's U.S. Pat. No. 5,199,813 dated Apr. 6, 1993, there is disclosed a road marker weight having a plurality of stacked side walls of discarded vehicle tires. In applicant's copending application Ser. No. 08/442,504, filed May 16, 1995, Pat. No. 5,568,913, there is disclosed an impact absorbing device employing the annular tread portions of discarded vehicle tires after the side walls have been cut therefrom. Applicant has now extended his expertise for uses for the tire tread portions to vehicle mud guards.

SUMMARY OF THE INVENTION

The vehicle mud guard of the present invention comprises at least one component of a tread portion cut from the annular tread portion of a discarded vehicle tire. The component is fastened to one leg of a connector, such as a T flange member, with the other leg of the T flange member being secured to the vehicle around the fender and behind the front and back wheels to provide mud flaps. Another T flange member can be employed for connecting a pair of tread portion components wherein opposing side edge portions of the tread components abut the web of the T flange and each side edge portion of the tread component is fastened to a respective leg of the T flange. The vehicle mounting T-flange extends transversely to the first T-flange and has one of its leg members fastened to the end edge portions of the pair of components. The other leg of the vehicle mounting flange is fastened to the vehicle.

BRIEF DESCRIPTION OF THE DRAWINGS

FIG. 1 is a perspective view showing the discarded tire tread components of the present invention mounted on a vehicle, around the fender and behind the front and rear tires;

FIG. 2 is a perspective view of a pair of discarded tire tread components fastened to a pair of T flanges;

FIG. 3 is a view taken along line 3—3 of FIG. 2;

FIG. 4 is a view taken along line 4—4 of FIG. 1; and

FIG. 5 is a fragmentary sectional side elevational view showing the tread component mounted on the vehicle to provide a mud flap for the tires.

DESCRIPTION OF THE PREFERRED EMBODIMENTS

Referring to the drawings and, more particularly to FIG. 1, the vehicle mud guards 1 and 2 of the present invention are adapted to be mounted, respectively, on the edge of a vehicle fender adjacent the wheel well and behind the front and rear wheels of the vehicle to provide mud flaps for the wheels.

The details of the construction of the mud flaps 2 are shown in FIGS. 2 and 3 wherein it will be seen that a pair of discarded tire tread components 3 and 4 have their opposing side edge portions 3a and 4a secured to a T-flange member 5 wherein each edge portion 3a, 4a abuts the web portion 5a of the T-flange member 5 and is fastened to a respective leg 5b, 5c of the T-flange 5 by suitable fasteners, such as, nut and bolt assemblies 6.

A second T-flange member 7 is provided for mounting the mud flap 2 on the vehicle, wherein the end edge portions 3b and 4b of the tire tread components 3 and 4 abut the web portion 7a of the T-flange member 7 and are fastened to one of the legs 7b of the T-flange 7 by nut and bolt assemblies 8. The other leg 7c of the T-flange member 7 is fastened to the vehicle chassis 9.

While a pair of tire tread components 3 and 4 are employed to fabricate the mud flaps 2 as will be seen in FIGS. 1 and 4, a single arcuate tire tread component 10 is employed for the mud guard 1 on the edge of the vehicle fender 11 adjacent the wheel well 12. A bendable, arcuate T-flange member 13 is provided and the longitudinal edge portion 10a of the tread component abuts the web 13a of the T-flange and is bolted as at 14 to one of the legs 13b of the T-flange. The other leg 13c of the T-flange is bolted as at 15 to the portion 11a of the vehicle fender 11 within the wheel well 12.

If desired, additional tire tread components 16 can be secured to the vehicle bumper 17.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. A vehicle mud guard comprising a tire tread component from a discarded tire, said component having a longitudinally extending edge portion and a transversely extending edge portion, a plate member having a longitudinally extending edge portion and a transversely extending edge portion, first fastening means securing the transversely extending edge portion of said plate member to the vehicle, and second fastening means securing the longitudinally extending edge portion of said tire component to the longitudinally extending edge portion of said plate member.

2. A vehicle mud guard comprising, at least one tire tread component from a discarded tire, said component having a longitudinally extending edge portion and a transversely extending end portion, a transversely extending connector member having a web portion and a pair of oppositely extending legs, the transversely extending end portion of said tire tread component abutting the web portion of said connector member, first fastening means connecting said end portion of said transversely extending end portion of said tire tread component to one of the legs of said connector member, and second fastening means connecting the other leg of said connector to said vehicle.

3. A vehicle mud guard according to claim 2, wherein the connector member is arcuate and said other leg of the connector member is secured to the edge of the vehicle fender adjacent the wheel well.

4. A vehicle mud guard according to claim 2, wherein a second tire tread component having a longitudinally extending edge portion and a transversely extending end portion is positioned adjacent the first-mentioned tire tread component, the longitudinally extending edge portion of said tire tread components extending parallel to each other, a second connector member having a web portion and a pair of oppositely extending legs, the longitudinally extending edge portions of said first and second tire components abutting the web of said second connector member, third fastening means connecting the longitudinally extending edge portion of each tire tread component to a respective leg of said second connector member and fourth fastening means connecting the transversely extending edge portion of said second tire tread component to said one leg of said first-mentioned connector member, to thereby provide a mud flap when secured to the vehicle behind the wheels thereof.

5. A vehicle mud guard comprising a tread component from a discarded tire, fastening means selectively securing the component to the vehicle fender adjacent the wheel well or to the vehicle behind the wheels thereof, to thereby provide a mud flap.

* * * * *